Oct. 7, 1969   J. R. PETRE   3,470,717
LAUNDRY MACHINE
Filed Jan. 2, 1968   6 Sheets-Sheet 1

INVENTOR
JOHN R. PETRE

BY George H. Tritzinger
AGENT

Oct. 7, 1969  J. R. PETRE  3,470,717
LAUNDRY MACHINE

Filed Jan. 2, 1968  6 Sheets-Sheet 2

INVENTOR
JOHN R. PETRE

BY George H. Fritzinger
AGENT

INVENTOR
JOHN R. PETRE

BY George H. Fritzinger
AGENT

United States Patent Office 3,470,717
Patented Oct. 7, 1969

3,470,717
LAUNDRY MACHINE
John R. Petre, Cincinnati, Ohio, assignor to McGraw-Edison Company, Elgin, Ill., a corporation of Delaware
Filed Jan. 2, 1968, Ser. No. 694,989
Int. Cl. D06f *31/00, 29/00, 35/00*
U.S. Cl. 68—9                                            14 Claims

ABSTRACT OF THE DISCLOSURE

This invention relates to a progressive type of laundry machine permitting a plurality of different treating operations to be carried out simultaneously. The machine comprises a series of open top treating tubs arranged in a row, and a common conveyor belt having portions looping down into the respective tubs to form work-treating pockets for respective batches of clothes. The conveyor belt rides on motor-driven rollers at the tubs and at the loading and unloading stations. By controlling the relative speeds of the respective drive rollers any loop can be converted into a straight run of the belt across a tub or station to raise the batch from the tub and transfer it to the next tub or station without disturbing the operation at the other tubs. Different control systems are provided for transferring the batches in different modes. The batches are tumbled by the traveling movement of the conveyor belt and may be washed, bleached, rinsed and dried in respective tubs adapted for carrying out these respective operations.

---

An object of the invention is to provide a progressive batch washer adapted for carrying out a plurality of different treating operations simultaneously in respective tubs and of transferring the respective batches selectively from tub to tub through the machine.

Another object is to provide a laundry machine wherein a common conveyor belt is controlled to advance individual batches of clothes from one tub to the next through the machine.

Another object is to provide such laundry machine wherein the conveyor belt loops down into the operating tubs and tumbles the clothes by a traveling movement of the belt during a work-treating operation.

Another object is to provide such laundry machine wherein individual batches of clothes are transported from one tub to the next by selectively controlling the speed of portions of the belt to convert a loop of the belt at one tub to a straight run across the top of the tub whereby to raise the batch of clothes in the tub and transfer it to the next tub.

Another object is to provide novel means for keeping the clothes centered on the belt within the respective tubs.

These and other objects and features of the invention will be apparent from the following description and the appended claims.

In the description of my invention reference is had to the accompanying drawings, of which.

Figure 1:
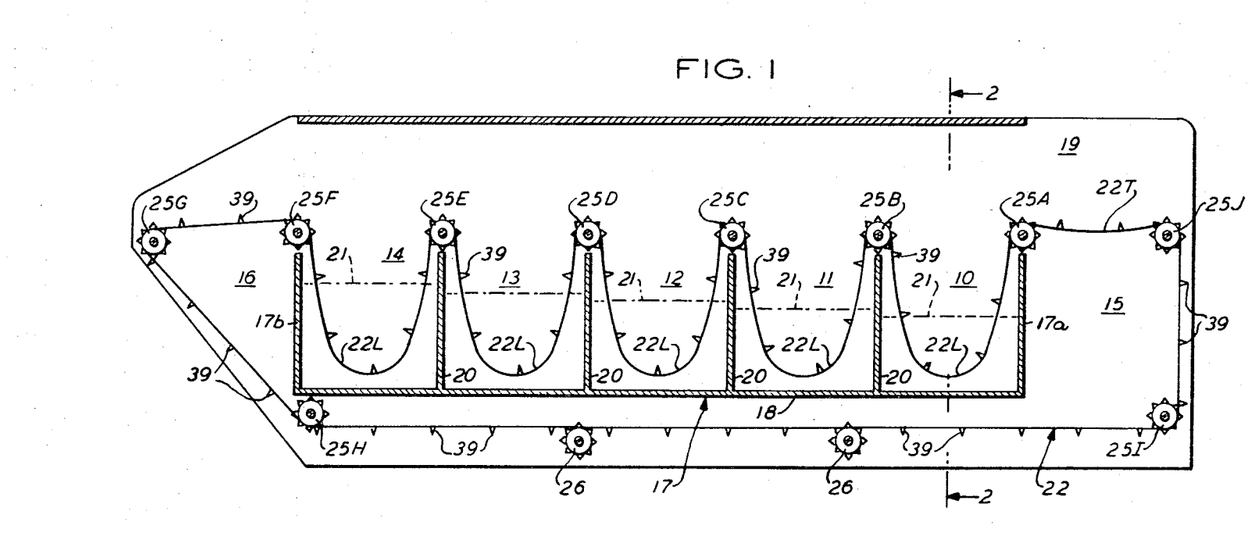
FIGURE 1 is a left side vertical sectional view illustrating a laundry machine according to the invention.

The present laundry machine is of an elongate construction comprising a row of tubs of which five are shown in FIGURE 1 numbered 10 to 14. The row of tubs is preceded by a loading station 15 and is followed by an unloading station 16. The successive tubs are portions of a long tank 17 having a bottom wall 18, sidewalls 19 and vertical partition walls 20. Each tub is provided in known manner with drain valves, and with inlets for water, soap, bleach, etc. Also, as is well known, the tubs may be interconnected to maintain the baths in the tubs at different levels shown by the broken line 21 in FIGURE 1 with the liquid in contra-flow through the tubs.

Figure 9:
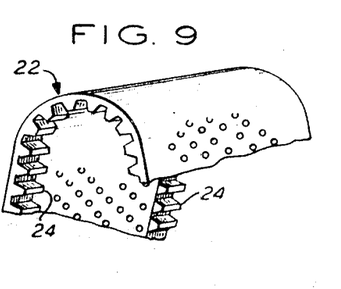
FIGURE 9 is a fractional view illustrating another form of conveyor belt.

A conveyor belt 22 has a top run across the loading station 15, the tubs 10 to 14 and the unloading station 16 in the sequence named, and has a bottom run returning below the tank 17. This belt may be of any smooth perforated material such as of rubber or plastic, or fabric treated with rubber or plastic with or without metal reinforcement, or may be of a smooth metal mesh or link construction. The belt may have sprocket holes 23 in its side borders (FIGURE 2) or may have two tracks 24 on its underside (FIGURE 9) which have driving engagement with a series of drive rollers 25 of the sprocket or cog wheel type depending upon the form of the conveyor belt. There is for instance a drive roller 25A above the leading end wall 17a of the tank 17, drive rollers 25B to 25E above the successive partition walls 20, and drive roller 25F above the far end wall 17b of the tank, a drive roller 25G at the unloading station, drive rollers 25H and 25I defining the bottom run of the belt and a drive roller 25J at the loading station. Additionally, there are support rollers 26 for the bottom run as is shown in FIGURE 1.

Figure 3:
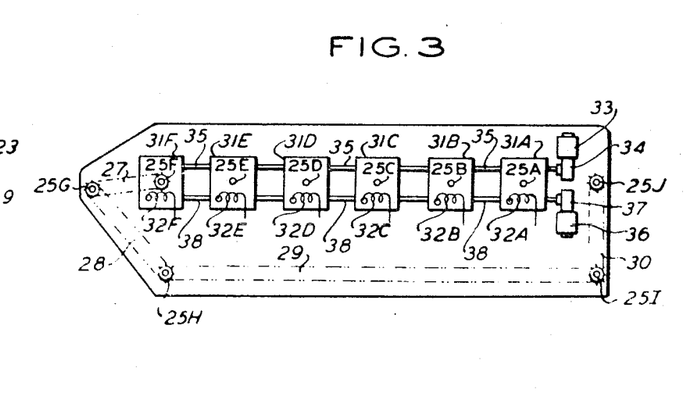
FIGURE 3 is a diagrammatic view illustrating a drive system for the conveyor belt.

The drive rollers 25F to 25J are interconnected by a series of chain or timing belts 27, 28, 29 and 30 so that all of these drive rollers are driven in unison as is shown in FIGURE 3. The group of drive rollers 25F–25J, and the respective drive rollers 25A to 25E are individually controlled by respective drive clutches 31F and 31A to 31E. The respective clutches have clutch shifting actuators represented by respective coils 32F and 32A to 32E. The clutches and actuators are set to drive the respective rollers at normal speed from a motor 33 through step-down gearing 34 and shafting 35, but when a clutch actuator is operated it drives the respective roller at a different speed—i.e., higher or lower depending on the mode of operation as later described—from a motor 36 through a step-down gearing 37 and shafting 38.

Figure 2:
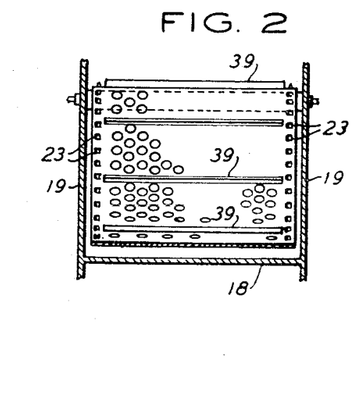
FIGURE 2 is a fractional section on the line 2—2 of FIGURE 1.

The conveyor belt 22 has such length that it is straight across one of the tubs or loading stations and is looped down into all of the other tubs or loading stations. These looped portions form pockets for respective batches of clothes to be washed. In FIGURE 1, for example, the belt has a straight run 22T at the loading station and has a loop 22L in each tub. By increasing the relative speed of the respective drive rollers 25F–25A in the sequence named the loops in tubs 14–10 can be changed successively into straight runs with simultaneous changing of a straight run into a loop at another tub or station. As a loop is so changed into a straight run a batch of clothes in the loop is gradually raised and then transferred to the next tub or station. To facilitate such transfer of the batches as well as to tumble the clothes of the respective batches during the treating operations in the respective tubs, the conveyor is provided with transverse ribs or lifters 39 at suitable intervals as shown in FIGURES 1 and 2.

Figure 6:
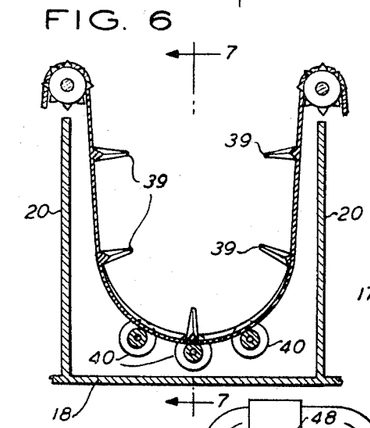
FIGURE 6 is another longitudinal sectional view through one of the tubs illustrating further means for centering the batch on the conveyor belt.
Figure 7:
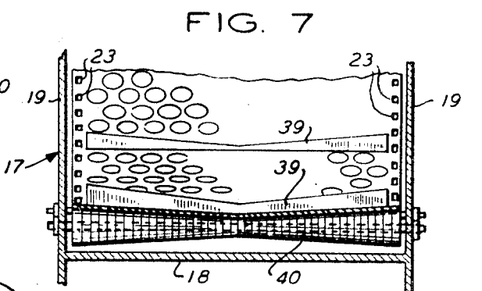
FIGURE 7 is a section on the line 7—7 of FIGURE 6.

In FIGURES 6 and 7 the transverse lifters 39 are shown as having a receding height proceeding from the ends towards the center thereof. This is done so that the lifters will tend to pitch the clothes inwardly and keep them from getting caught between the conveyor and the sidewalls 19 of the tank 17.

Also, the belt conveyor is preferably provided with a transverse flexibility permitting it to sag at the middle from the weight of the batches of clothes. The construction of the lifters 39 with their reduced height at the center as abovedescribed gives the lifters flexibility to permit such sagging of the belt at the middle. In cases where heavy batches of clothes are treated, a set of cradle rollers 40 are provided to support the belt loops in each tank as is shown in FIGURES 6 and 7.

Figure 4:
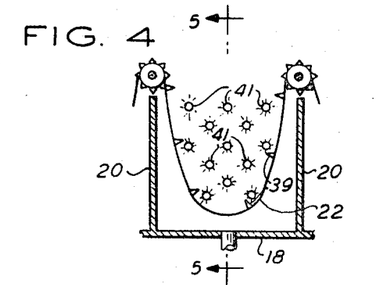
FIGURE 4 is a longitudinal vertical sectional view through one of the tubs illustrating a hydraulic means for centering the batches on the conveyor belt and for increasing the treating efficiency.
Figure 5:
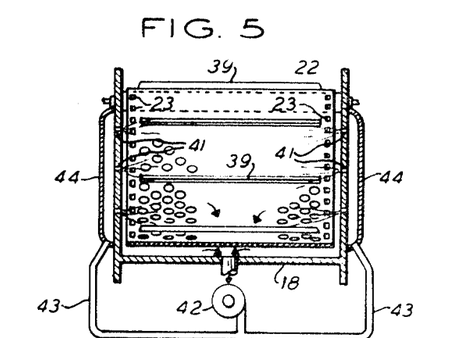
FIGURE 5 is a section on the line 5—5 of FIGURE 4.

As a further means for keeping the batches of clothes centered on the conveyor belt in the respective tubs, the sidewalls of the tubs may be provided with nozzles 41 flush with the walls as are shown in FIGURES 4 and 5, and pumps 42 are provided for the respective tubs for drawing the treating liquid from the tub at the bottom and forcing it under pressure via tubes 43 and manifolds 44 through the nozzles 41 in the sidewalls. The treating liquid is thus sprayed under pressure from the sidewalls against the clothes not only to keep the clothes clear of the sidewalls but also to increase the treating efficiency.

Figure 8:
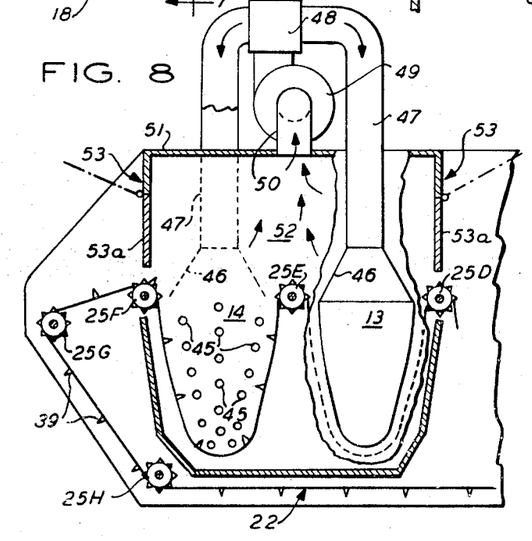
FIGURE 8 is a longitudinal sectional view through a pair of successive tubs with cooperative means to adapt the tubs to serve as drying tumblers.

The last two tubs 13 and 14 in the laundry machine may comprise a drying chamber as is illustrated in FIGURE 8. For example, the sidewalls of the tank at these two tubs may have a series of openings 45, and applied against the outer sides of these apertured sidewalls are manifolds 46 which are connected by vertical ducts 47 through a heater 48 to the output of a blower 49. The inlet of the blower is connected to a duct 50 leading through a top wall 51 of a chamber 52 having front and back walls 53 leading down from the top wall to the drive rollers 25 at the inlet and outlet ends of the two tubs. Thus, the blower draws air upwardly from the top of the two tubs 13 and 14, feeds the air through the heater 48 and circulates it back into the tubs from the sides. During this circulation of heated air the batches of clothes in the two tubs are tumbled by the traveling movement of the conveyor belt to aid in the passage of the heated air through the clothes. The front and back walls 53 have hinged doors 53a to permit the batches of clothes to be fed into the tub 13 and out of the tub 14.

In addition to this desirable incorporation of the drying function into the end section of a combined washing-drying apparatus, it will be apparent that a dryer of this type could also be made as a separate machine, provided then with a loading station. In the case of either the dryer or the washer compartments it will be understood that the dimensions of the parts can be selected to provide whatever depth of loop affords the optimum dropping and tumbling action.

Figure 10:
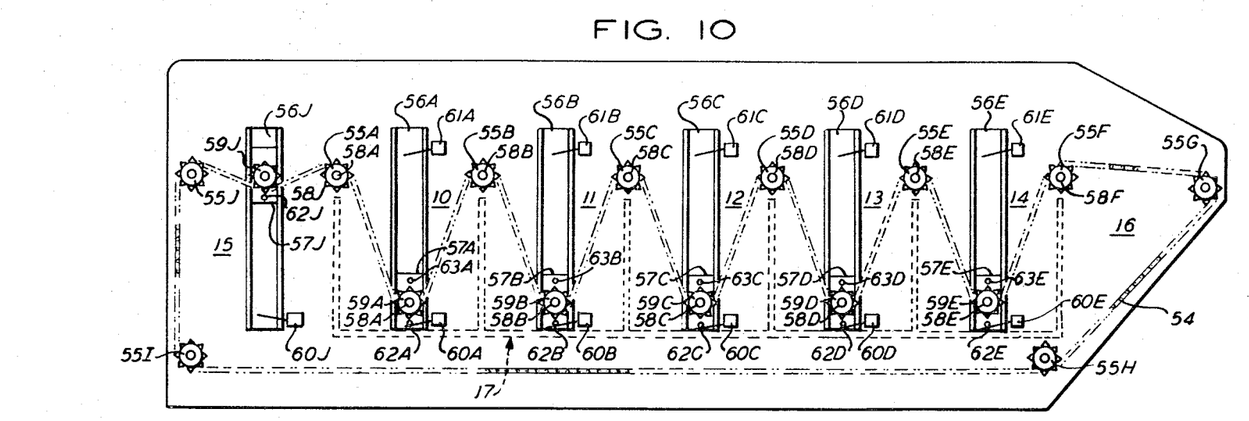
FIGURE 10 is a right side view of the laundry machine showing a drive control means responsive according to the positioning of the conveyor belt at the respective tubs.

A means for sensing when the conveyor belt at a tub or station is in a downward loop condition or an upward straight-run condition is shown in FIGURE 10. At one side of the tank 17 is an endless chain 54 running over sprocket rollers 55A–55J on shaft extensions of the respective sprocket rollers 25A–25J. Centered with respect to the tubs 10–14 and the loading station 15 are vertical guideways 56A–56E and 56J in which are mounted respective slide blocks 57A–57E and 57J. On these slide blocks are respective shafts 58A–58E and 58J on which are journaled respective intermediate sprocket rollers 59A–59E and 59J. The chain 54 is trained around the intermediate sprocket rollers and is held in a taut condition across the fixed sprocket rollers 55A–55J by the weight of the slide blocks. Since the fixed sprocket rollers 55A–55F are rotated in unison with the respective sprocket rollers 25A–25F carrying the conveyor belt the chain portions between the successive fixed rollers 55A–55F are maintained in a loop or straight-run condition the same as are the respective portions of the conveyor belt. Mounted at the bottom of the guideways 56A–56E and 56J are respective drive-control switches 60A–60E and 60J and mounted at the top of the guideways 56A–56E and 56J are respective drive-control switches 61A–61E.

When a slide block 57A–57E or 57J is in a downmost position indicating a loop condition of the conveyor belt at the respective tub or station a lower side pin 62A–62E or 62J on the respective slide block bears against an arm of the respective drive control switch 60A–60E or 60J to hold the switch operated; and similarly, when a slide block is in an uppermost position indicating a straight run of the conveyor belt across the tub an upper side pin 63A–63E bears against an arm of the respective drive control switch 61A–61E to hold the switch operated. These switches are connected in the electric circuitry of the drive system to control the latter as is herein next described.

Figure 11:
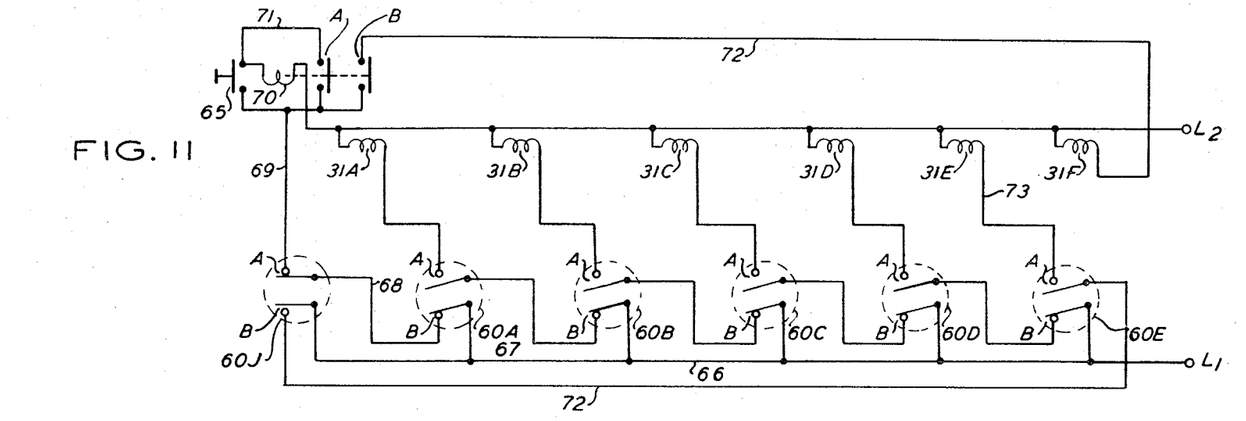
FIGURE 11 is a schematic circuit diagram of the drive control system for one mode of operation of the machine.

In a first mode of operation the tubs are unloaded consecutively starting with the last tub 14 and proceeding automatically to the first tub 10 when a transfer operation is initiated. By way of example, only the first tub may first be loaded before the machine has started to do a work treating operation. During this work treating operation—which may typically be 12 minutes long—the slide block 57J at the loading station 15 is in its upward position causing the switch 60J to be not operated and the slide blocks 57A–57E are in their downward positions causing each of the switches 60A–60E to be operated. Each of the switches, 60A–60E and 60J is of a double-pole single-throw type as is shown in FIGURE 11.

Upon pressing a push button switch 65 a transfer operation is initiated to complete a circuit from the line $L_1$ via leads 66 and 67, lower contact B of switch 60A, lead 68, upper contact A of switch 60J, lead 69, push button switch 65, relay 70 and line $L_2$. The relay contacts A and B are thus closed. The contacts A provide a hold circuit for the relay running from the line $L_1$ via the contact B of switch 60A, contacts A of switch 60J, lead 69, contacts A of the relay, lead 71, and the relay coil to line $L_2$. Closure of the relay contacts B completes a circuit from the line $L_1$ via the contacts B of the switch 60A, contacts A of switch 60J, lead 72 and the coil of clutch actuator 31F to line $L_2$. The sprocket roller 25F is then driven at a higher than normal speed to unload the tub 14 and at the same time to cause a pocket to be formed at the loading station 15.

As the slide block is raised from its lowermost position at the tub 14, the switch 60E is returned to its unoperated position and thereupon when the slide block at the loading station 15 reaches its downmost position the switch 60J is operated. A resultant opening of the contacts A of switch 60J breaks the holding circuit for the relay 70, causing the relay to return to unoperated position, and it breaks the circuit to the clutch actuator 31F causing the sprocket rollers 25F to 25J to return to normal speed. The closing of the contacts B of the switch 60J now completes a circuit for the clutch actuator 31E from the line $L_1$ via the contacts B of switch 60J, lead 72, contacts A of switch 60E, lead 73 and clutch actuator 31E to the line $L_2$. Thus, at the same time that the rollers 25F–25J are returned to normal speed, the sprocket roller 25E is started at a higher speed to cause the belt to form a pocket again at the tub 14 and to form a straight run at the tub 13 to transfer the batch from the tub 13 to the tub 14.

During the transfer from the tub 13 to tub 14 switch 60D is first returned to unoperated position and then the switch 60E is moved to operated position. A resultant opening of the contacts A of switch 60E breaks the circuit for the clutch actuator 31E causing the sprocket roller 25E to return to normal speed, and the resultant closing of the contacts B of switch 60E completes a circuit from the line $L_1$ via the contacts A of switch 60D to activate the clutch shift actuator 31D whereby to start the sprocket roller 25D at higher speed. This causes the conveyor belt to be drawn up into a straight run at the tub 12 and the belt to loop down into a pocket at the tub 13 with a resultant transfer of the batch in the tub 12 to the tub 13. This sequence of operations continues to transfer the batch in tub 11 to tub 12, the batch in tub 10 to tub 11, and then the batch at the loading station 15 to the tub 10. During the transfer from the loading station 15 to the tub 10, the switch 60J is first returned to unoperated position and then the switch 60A is operated as shown in FIGURE 11. The breaking of the contacts A of switch 60A restores the sprocket roller 25A to normal speed with the result that all drive rollers are now again at normal speed, and the closing of the contacts B of switch 60A prepares the circuit for activation again of the transfer relay 70 to start another sequence of transfer operations when the push button switch 65 is again pressed.

It will be noticed that in this first mode of operation, as soon as a transfer operation is started, the conveyor goes down into a loop or pocket at the loading station and stays thus while all of the pockets are transferring. The new load can be introduced into this pocket at any time; or if the transfer sequence has been completed, the new work can be deposited on the conveyor in its raised position and thereby carried to the first bath pocket.

In a second mode of operation of the laundry machine, the respective batches in the tubs 10 to 14 are transferred selectively from any tub to the next succeeding tub by pressing a push button switch for the respective tub. During a work treating operation all of the sprocket rollers 25A to 25J are running at normal speed. At the outset, for instance, a batch could be located in the first tub 10 and left to wash, say for fifteen minutes. When the push button for the tub 10 is pressed the batch would be transferred to the tub 11 and a new batch would go into the tub 10. Then after perhaps ten minutes in tub 11 the batch could be transferred to the tub 12 but the other batch would be left to continue to wash. Similarly, the first batch could be transferred along to shorter rinse baths as desired independent of the other later batches. The respective drive control circuits for transferring the batches from the tubs 10 to 14 to the next succeeding tubs or stations are shown in FIGURES 12 to 16. Each drive control circuit includes the drive control switches 60 and 61 associated with the respective tub from which the transfer is to be made. In this second mode of operation the drive system is arranged so that one or a group of sprocket rollers can be run at lower than normal speed instead of at a higher speed as in the first mode of operation. As the transfer is made from one tub to the next a sprocket roller or group of sprocket rollers, as the case maye be, is run at lower speed until the transfer is effected at the respective tub and then this group is returned to normal speed and the remaining sprocket rollers are run at lower speed until the pocket is reformed at that tub with return of the conveyor belt to a straight run condition at the loading station. The group of sprocket rollers involved is different for each tub, and the gang switches used in each case are different as shown in FIGURES 12 to 16. However, no drive control switches are used in the second mode of operation at the loading station. Although the same load control switches are indicated as being used at the bottom of the guide ways 56 in the second mode of operation as in the first mode of operation, only the upper A contacts of these switches are employed in the drive control circuitry.

Figure 12:
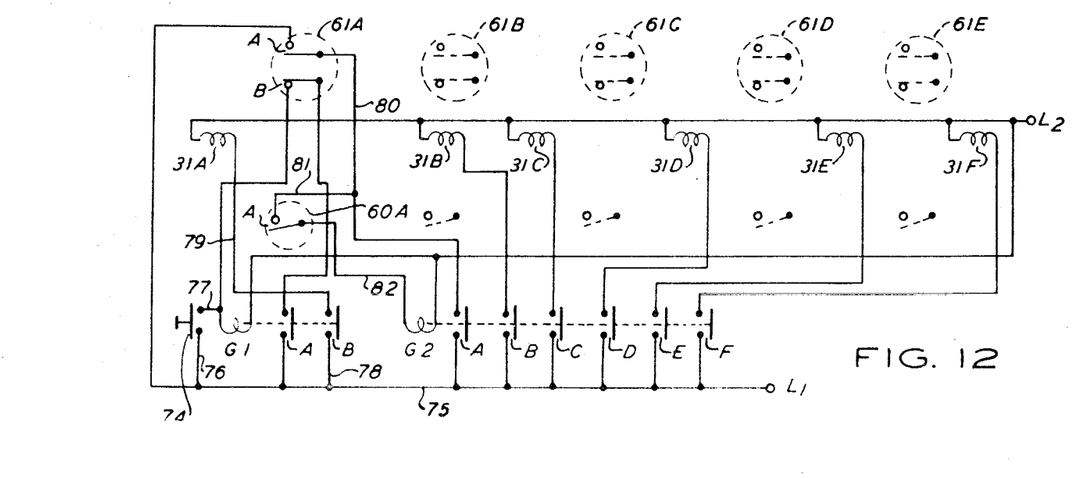
FIGURES 12 to 16 are schematic circuit diagrams of the drive control systems for transferring the work loads from the respective tubs proceeding from right to left in FIGURE 1, to the next succeeding tubs or stations.

Assuming that the machine has a batch only in tub 10 and it is time to transfer to tub 11, the operator will press the push button switch 74 of FIGURE 12. This completes a circuit from line $L_1$ via lead wires 75, 76 and 77, coil of gang switch G1 and line $L_2$ to operate the gang switch to close its contacts A and B. The circuit is thereupon completed from $L_1$ via lead 75, lead 78, B contacts of gang switch G1, lead 79 and clutch switch actuator 31A to line $L_2$. Sprocket roller 25A is therefore driven at a reduced speed while all other sprocket rollers remain at normal speed, causing the conveyor belt to draw up at the tub 10 into a straight-run condition and a pocket to form at the loading station 15. Also, the closure of the contact A of the gang switch G1 completes a circuit via the B contacts of the drive control switch 61A to provide a hold circuit for the gang switch so that the pushbutton 74 can be released. When the conveyor belt begins to draw up at the tub 10 the slide block at that station releases the switch 60A causing its A contacts to close but without any immediate result.

When the conveyor belt reaches a substantially straight-run condition at the tub 10 the contacts A of switch 61A are closed and the contacts B are opened. The opening of the B contacts breaks the hold circuit for the gang switch G1. As the gang switch drops out the circuit for the clutch actuator 31A is opened causing the sprocket roller 25A to return to normal speed. When the contacts A of switch 61A close a circuit is completed from the line $L_1$ by lead wire 75, contacts A of switch 61A, lead wires 80 and 81, contacts A of switch 60A, lead wire 82 and coil of gang switch G2 to line $L_2$, causing the gang switch G2 to be operated and each of its six sets of contacts A to F to be closed. The A contacts provide a hold circuit for the gang switch G2 which parallel the A contacts of the switch 61A but which are in series with the A contacts of the switch 60A so that the gang switch G2 will remain operated during reformation of a loop of the conveyor belt at the tub 10 until the loop is completed. The five remaining sets of contacts B through F of the gang switch G2 connect respectively to the clutch shifting actuators 31B through 31F to cause the sprocket rollers 25B to 25F to be now driven at reduced speed. Since the sprocket roller 25A is still being driven at normal speed the driving of the remaining sprocket rollers 25B to 25J at lower than normal speed causes the conveyor pocket to reform at the tub 10 and the conveyor belt to return to a straight-run condition at the loading station. When the pocket is reformed at the tub 10 and the slide block has opened contacts A of switch 60A the hold circuit for the gang switch G2 is broken causing the gang switch to return to normal position. This return of the gang switch breaks each of the clutch shifting actuators of sprocket rollers 25B to 25F to cause all of the sprocket rollers to run again at normal speed.

Figure 13:
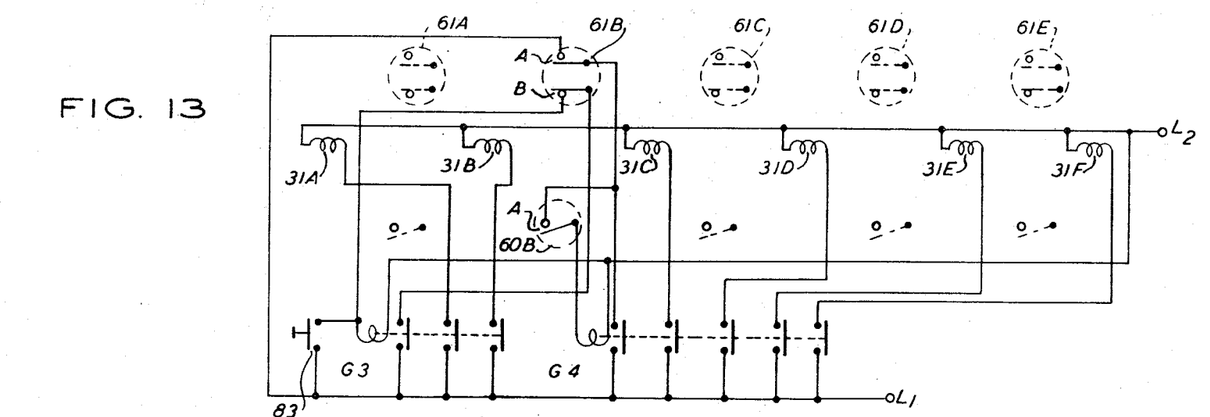
Figure 14:
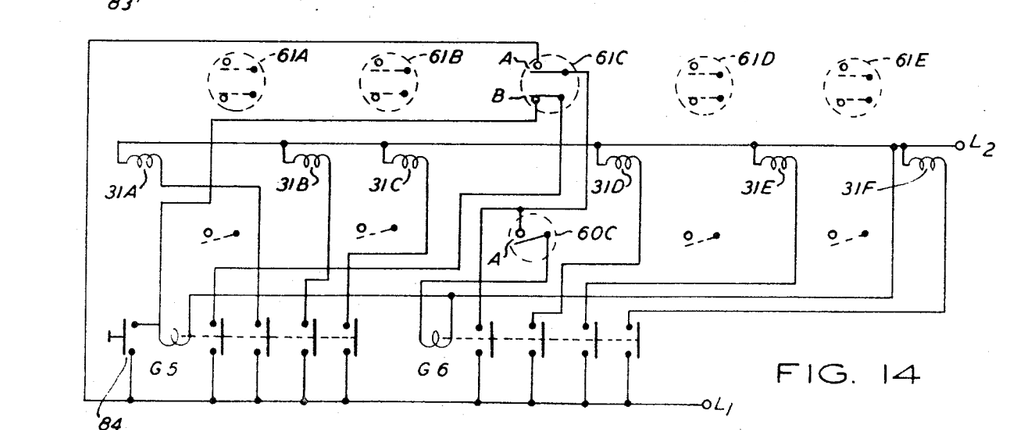
Figure 15:
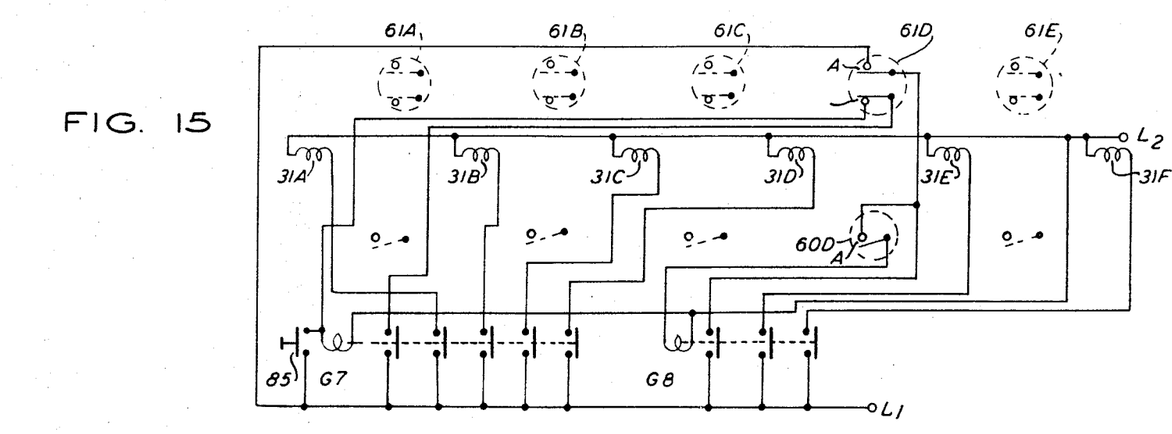
Figure 16:
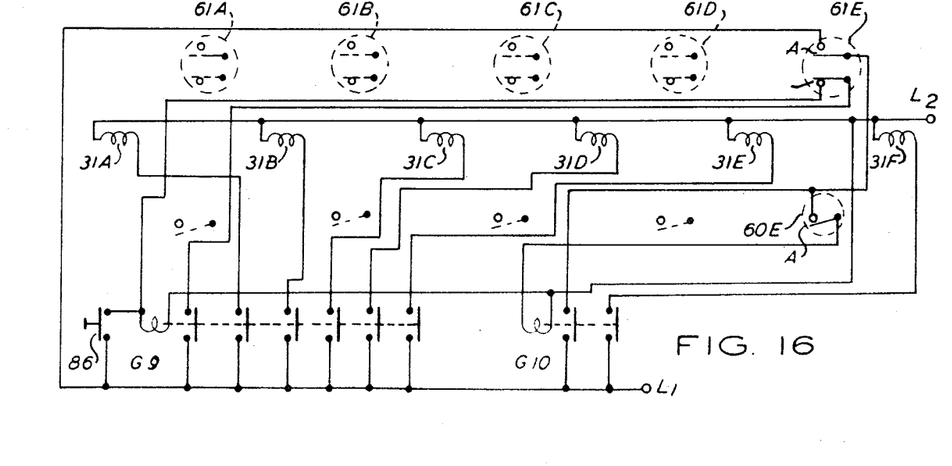

When a load is to be transferred from the tub 11 to the tub 12 a pushbutton switch 83 of the control circuit shown in FIGURE 13 is depressed. As can be seen from that figure, the same mode of control is effected but now both sprocket rollers 25A and 25B are first reduced in speed while all the other sprocket rollers remain at normal speed to cause the conveyor pocket at the tub 11 to be drawn up. When it has drawn up to transfer the load to the pocket 12, the gang switch G3 is opened causing the sprocket rollers 25A and 25B to be returned to normal speed, and the gang switch G4 is closed causing the sprocket rollers 25C to 25J to run at reduced speed. This causes a pocket to be reformed at the tub 11 and the gang switch G4 to be dropped to return the sprocket rollers 25C to 25J to normal speed. All of the sprocket rollers are now again at normal speed. In the same manner the load will be transferred from the tub 12 to the tub 13 when the pushbutton switch 84 of the circuit of FIGURE 14 is depressed; the load will be transferred from the tub 13 to the tub 14 when the pushbutton switch 85 of the circuit of FIGURE 15 is depressed; and the load in the tub 14 will be transferred to the unloading station when the pushbutton switch 86 of the drive control circuit of FIGURE 16 is depressed. In each instance, the first gang switch controls the group of sprocket rollers to be first reduced in speed, and the second gang switch controls the remaining group of sprocket rollers to be thereafter reduced in speed to restore the pocket in the tub just unloaded. For instance, in transferring the load from the last tub 14 the sprocket rollers 25A to 25E are first reduced in speed through the gang switch 69, and thereafter the remaining sprocket rollers 25F to 25J are reduced in speed through the gang switch G10. When the pocket is reformed in the tub 14 the contacts A of the lower drive control switch 60E are opened to restore the sprocket rollers 25F to 25J to normal speed so that the machine can carry out a normal work treating operation.

Although in the second mode of operation the preferred way is to vary the speed of the required rolls between normal speed and reduced speed, the same result can be had by varying the speed between normal speed and increased speed. For instance, to transfer from tub 10 to tub 11 in an alternative way, the roll 25A would be held at normal speed and the other rolls would be driven at increased speed. Thereupon, the other rolls would be returned to normal speed and roll 25A would be drven at increased speed, etc.

Figure 17:
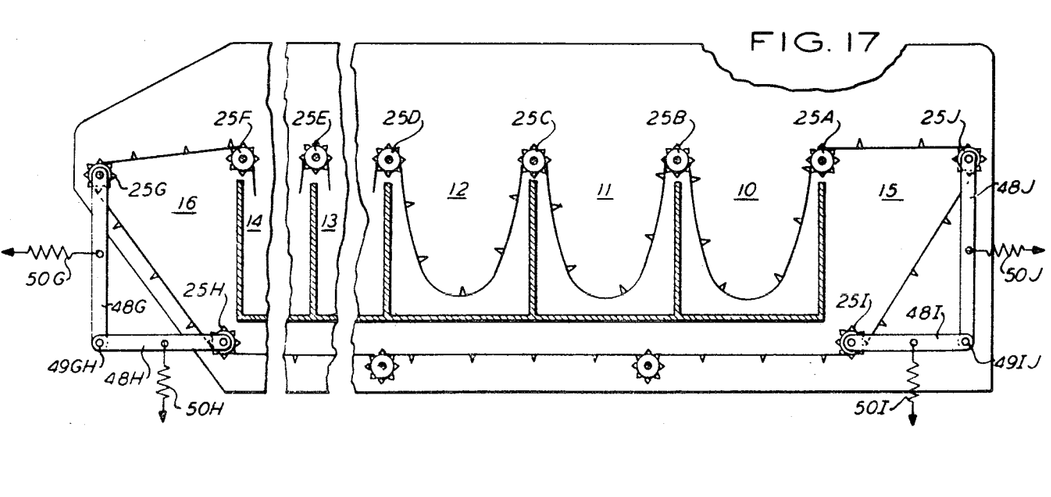
FIGURE 17 is a side view similar to FIGURE 1 showing a modified arrangement which places the return run of the conveyor belt under constant tension.

The return length of the conveyor belt on the sprocket roller 25F to the sprocket roller 25A may be held under constant tension by spring biasing of one or more of the sprocket rollers 25G–25J as is indicated in FIGURE 17. In this embodiment the sprocket rollers 25A to 25F are drive rollers and the sprocket rollers 25G to 25J are only take-up rollers. Thus, as the relative speed of the respective sprocket rollers 25A–25F is changed to convert one or more of the conveyor loops in the tubs 10–14 into straight runs across the respective tubs, the return run of the conveyor belt is lengthened and maintained without slack by the biased sprocket rollers 25G–25J. This arrangement permits a plurality of loops to be converted to respective straight runs so that the batches of clothes in the respective tubs may be transported to by-pass selectively one or more of the tubs as may be desired. In this embodiment the sprocket rollers 25G–25H are journaled on levers 48G and 48H which may be pivoted to the frame (not shown) on a common axis 49GH, and the sprocket rollers 25I and 25J are journaled on levers 48I and 48J which are pivoted to the frame on a common axis 49IJ. The levers are biased by respective tension springs 50G–50J to maintain the constant tension on the return of the belt.

The raising and the lowering of the conveyor loops has herein been described as being accomplished by driving a part of the conveyor at one speed and another part at a second speed. It will be understood that relative motion for variously controlling the loops can also be effected by temporarily stopping some of the driving rollers while others rotate, or by combinations of speeds and stoppage.

I claim:

1. A laundry machine comprising a plurality of tubs arranged in a row, said tubs being adapted for performing predetermined treating operations on batches of clothes placed therein, a common conveyor belt passing across said row of tubs and looping down thereinto to support the respective batches of clothes, and drive means for advancing said conveyor belt to cause the belt to tumble the batches of clothes in said tubs.

2. The laundry machine set forth in claim 1 including transverse lifter members secured to said belt for aiding in the tumbling of the clothes as said belt is advanced, said respective lifter members having a receding height proceeding from the ends to the center thereof for causing each lifter member to tend to pitch the clothes inwardly from the sides of the belt towards the middle thereof.

3. The laundry machine set forth in claim 1 wherein said belt has a flexibility to permit the belt to sag at the middle responsive to the weight of the batches of clothes carried thereby, and cradling rollers at the bottom of said tubs for supporting the lower portions of the belt loops in said sagged condition.

4. The laundry machine set forth in claim 1 wherein the walls of said tubs at the opposite sides of said conveyor belt have nozzle openings, including pump means for feeding a fluid medium under pressure into said tubs via said nozzle openings for exerting a side thrust on the batches of clothes in said tubs to keep the clothes centered on said belt.

5. The laundry machine set forth in claim 4 wherein one of said tubs contains a liquid treating bath, and said pump means is connected to draw liquid from the bottom of the respective tub and to spray it back into the tub via said side nozzle not only to exert side force on the clothes in said tub to keep the clothes centered on said belt but also to increase the treating efficiency.

6. The lanudry machine set forth in claim 4 including an enclosure over the top of a predetermined one of said tubs to form a drying chamber, and wherein said pump means is connected to draw air from the top of said tub and to feed it under pressure into said tub from the sides thereof via said nozzles including means for heating the circulating air.

7. A laundry machine comprising a plurality of open-topped tubs arranged in a row and adapted for performing predetermined treating operations on batches of clothes placed therein, a conveyor belt passing across said row of tubs and looping down thereinto to support the respective batches of clothes, drive including drive rollers engaging said belt at the input and output sides of each of said tubs, and means for controlling said drive means either to maintain the loops in said tubs as the belt is advanced or to relatively move portions of said belt to convert a loop in a selected one of said tubs into an approximately straight run across the tub whereby to raise the batch of clothes in the tub and transport the same to a next station.

8. The laundry machine set forth in claim 7 including means beyond said tubs for accepting a slack in the belt upon conversion of a loop of the belt in one of said tubs into an approximately straight run across the tub.

9. The laundry machine set forth in claim 8 including a loading station at the input side of the first of said row of tubs, said loading station including a drive roller engaging said belt at a distance in advance of the roller at the input side of said first tub, said belt having a length causing it to have a straight run across said rollers at said loading station when the belt loops down into each of said tubs, and means for controlling said drive means to cause said belt to loop down between said rollers at said loading station when any one of said loops in said tub is converted into a straight run.

10. The laundry machine set forth in claim 9 wherein the drive roller at the output of the last of said row of tubs and the drive roller at the input of said loading station are intercoupled to rotate in unison and to maintain the belt in a taut condition therebetween.

11. The laundry machine set forth in claim 8 including shiftable rollers about which the return run of said belt is trained, and spring means biasing said shiftable rollers to maintain said return run under tension to accept slack when a loop in one of said tubs is converted into a straight run across the tub.

12. A laundry machine comprising a plurality of open-topped tubs in a row for performing predetermined treating operations on batches of clothes placed therein, a conveyor belt passing across said row of tubs and looping down thereinto to support the respective batches of clothes, drive rollers for said conveyor belt at the input and output sides of said tubs, drive means selectively operable for rotating said respective rollers at normal speed or at a different speed, switch means for each of said tubs differently operable according to whether said belt is looped down into the tub or is drawn up into a straight run across the tub, and control means for said drive means including said switch means to cause said drive means to rotate said rollers at the output sides of said tubs at an above-normal speed in sequence and to return each roller to normal speed before the next roller is increased in speed whereby the loops in said tubs are drawn up in sequence to transfer the batches from one tub to the next proceeding from the output to input ends of said row.

13. A laundry machine comprising a plurality of open-topped tubs in a row for performing predetermined treating operations on batches of clothes placed therein, a conveyor belt passing across said row of tubs and looping down thereinto to support the respective batches of clothes, drive rollers for said conveyor belt at the input and output sides of said tubs, drive means selectively operable for rotating said respective rollers at normal speed or at a different speed, switch means for each of said tubs differently operable according to whether said belt is looped down into the tub or is drawn up into a straight run across the tub, and a separate control system for each of said tubs each including only said switch means of the respective tub and a respective start control, means effective upon pressing one of said start controls to drive first one set of said rollers at a lower speed to convert the loop at the respective tub into a straight run, and means rendered operative by said respective switch means when the conveyor belt reaches a straight run condition at said tub to return said first set of rollers to normal speed and to drive the remaining set of said rollers at a lower speed to reform the loop in said tub.

14. A laundry machine comprising a plurality of open-topped tubs in a row for performing predetermined treating operations on batches of clothes placed therein, a conveyor belt passing across said row of tubs and looping down thereinto to support the respective batches of clothes, drive rollers for said conveyor belt at the input and output sides of said tubs, drive means selectively operable for rotating said respective rollers at normal speed or at a different speed, switch means for each of said tubs differently operable according to whether said belt is looped down into the tub or is drawn up into a straight run across the tub, and a separate control system for each of said tubs each including only said switch means of the respective tub and a respective start control, means effective upon pressing one of said start controls to drive first one set of said rollers at a speed different from normal to convert the loop at the respective tub into a straight run, and means rendered operative by said respective switch means when the conveyor belt reaches a straight run condition at said tub to return said first set of rollers to normal speed and to drive the remaining set of rollers at said different speed to reform the loop in said tub.

References Cited

UNITED STATES PATENTS

| | | | |
|---|---|---|---|
| 644,498 | 2/1900 | Cook | 68—9 XR |
| 3,009,343 | 11/1961 | Bochan | 68—20 |

FOREIGN PATENTS

| | | |
|---|---|---|
| 980,113 | 12/1950 | France. |

ROBERT L. BLEUTGE, Primary Examiner

U.S. Cl. X.R.

68—20, 157, 184